US012767813B2

(12) United States Patent
Jang et al.

(10) Patent No.: US 12,767,813 B2
(45) Date of Patent: Oct. 20, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Jeongmin Jang, Daejeon (KR); Chun Ho Park, Daejeon (KR); Yong Hee An, Daejeon (KR); Tae Hoon Kim, Daejeon (KR); Daeun Sung, Daejeon (KR); Wangrae Joe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1054 days.

(21) Appl. No.: 17/911,202

(22) PCT Filed: Dec. 7, 2021

(86) PCT No.: PCT/KR2021/018416
§ 371 (c)(1),
(2) Date: Sep. 13, 2022

(87) PCT Pub. No.: WO2022/158708
PCT Pub. Date: Jul. 28, 2022

(65) Prior Publication Data

US 2023/0109199 A1 Apr. 6, 2023

(30) Foreign Application Priority Data

Jan. 22, 2021 (KR) ........................ 10-2021-0009291

(51) Int. Cl.
*C08L 51/04* (2006.01)
*C08L 25/12* (2006.01)

(52) U.S. Cl.
CPC ............... *C08L 51/04* (2013.01); *C08L 25/12* (2013.01); *C08L 2205/025* (2013.01); *C08L 2205/03* (2013.01)

(58) Field of Classification Search
CPC .... C08L 51/04; C08L 25/12; C08L 2205/025; C08L 2205/03
See application file for complete search history.

(56) References Cited

U.S. PATENT DOCUMENTS 4,885,335 A 12/1989 Gallucci et al.
5,840,803 A 11/1998 Chang et al.
(Continued)

FOREIGN PATENT DOCUMENTS

CN 101163740 A 4/2008
CN 101360770 A 2/2009
(Continued)

OTHER PUBLICATIONS

KR100778012 translation (Year: 2007).*
(Continued)

*Primary Examiner* — Catherine S Branch
*Assistant Examiner* — Andrea Wu
(74) *Attorney, Agent, or Firm* — Morgan, Lewis & Bockius LLP

(57) ABSTRACT

The present disclosure relates to a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; 18 to 47% by weight of an aromatic vinyl compound-vinyl cyanide compound copolymer (B) having a weight average molecular weight of 70,000 to 150,000 g/mol; and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1. A method of preparing the ther-
(Continued)

moplastic resin composition, and a molded article including the thermoplastic resin composition are also disclosed.

14 Claims, 1 Drawing Sheet

(56) References Cited

U.S. PATENT DOCUMENTS

| | | | |
|---|---|---|---|
| 2006/0089462 | A1 | 4/2006 | O et al. |
| 2007/0287799 | A1 | 12/2007 | Ha et al. |
| 2009/0312495 | A1 | 12/2009 | Maeda et al. |
| 2010/0016507 | A1 | 1/2010 | Sumimoto et al. |
| 2013/0172485 | A1 | 7/2013 | Jin et al. |
| 2015/0315430 | A1 | 11/2015 | Nguyen et al. |
| 2019/0023893 | A1 | 1/2019 | Park et al. |
| 2020/0165439 | A1 | 5/2020 | An et al. |
| 2020/0283614 | A1 | 9/2020 | Jeong et al. |
| 2021/0024735 | A1 | 1/2021 | Park et al. |

FOREIGN PATENT DOCUMENTS

| | | | |
|---|---|---|---|
| CN | 108699315 | A | 10/2018 |
| JP | H07-33470 | B2 | 4/1995 |
| JP | 2007-177059 | A | 7/2007 |
| JP | 2019-19236 | A | 2/2019 |
| KR | 10-2004-0049066 | A | 6/2004 |
| KR | 10-0778012 | B1 | 11/2007 |
| KR | 10-2008-0020994 | A | 3/2008 |
| KR | 10-2013-0075812 | A | 7/2013 |
| KR | 10-1457403 | B1 | 11/2014 |
| KR | 10-2014-0146784 | A | 12/2014 |
| KR | 10-2014-0147286 | A | 12/2014 |
| KR | 10-2018-0131992 | A | 12/2018 |
| KR | 10-2019-0065944 | A | 6/2019 |
| KR | 10-2019-0114898 | A | 10/2019 |
| KR | 10-2020-0046696 | A | 5/2020 |
| KR | 10-2020-0089101 | A | 7/2020 |
| KR | 10-2161592 | B1 | 10/2020 |
| TW | 201434907 | A | 9/2014 |
| WO | 2010/058695 | A1 | 5/2010 |

OTHER PUBLICATIONS

Office Action issued Oct. 10, 2023 for counterpart Japanese Patent Application No. 2022-555152 Note: US 2020/0283614 A1 was cited in a prior IDS.

Office Action issued Mar. 15, 2024 for Chinese Patent Application No. 202180019785.5. (Note: KR 10-2013-0075812 A, WO 2010/058695 A1 & KR 10-2019-0065944 A were cited in a prior IDS.).

Office Action issued in corresponding Taiwanese Patent Application No. 110146993 dated Dec. 3, 2024.

International Search Report and Written Opinion issued in corresponding International Patent Application No. PCT/KR2021/018416, dated Mar. 10, 2022.

EESR dated Sep. 22, 2023 from the EPO corresponding European Patent Application No. 21 921 467.3.

Action dated Jun. 11, 2026 issued in the corresponding Indian Patent Application No. 202217050862.

* cited by examiner

THERMOPLASTIC RESIN COMPOSITION, METHOD OF PREPARING THE SAME, AND MOLDED ARTICLE INCLUDING THE SAME

CROSS-REFERENCE TO RELATED APPLICATION

This application claims priority to Korean Patent Application No. 10-2021-0009291, filed on Jan. 22, 2021 in the Korean Intellectual Property Office, the disclosure of which is incorporated herein by reference.

TECHNICAL FIELD

The present invention relates to a thermoplastic resin composition, a method of preparing the same, and a molded article including the same. More particularly, the present invention relates to a thermoplastic resin composition that does not contain phthalate-based compounds, which are environmental hormones harmful to the human body; does not emit toxic gases in case of fire; has processability equal or superior to that of a conventional PVC resin, which is a material for calendering and T-die extrusion; has excellent mechanical properties, such as impact strength, tensile strength, and elongation, surface hardness, and heat resistance; and is capable of preventing occurrence of whitening during bending due to excellent non-whitening properties, a method of preparing the thermoplastic resin composition, and a molded article including the thermoplastic resin composition.

BACKGROUND ART

Polyvinyl chloride (hereinafter referred to as "PVC") resins and t-polymethylmethacrylate (hereinafter referred to as "t-PMMA") resins are mainly used in the manufacture of decorative sheets through T-die extrusion processing and calendering.

A PVC resin is a homopolymer of vinyl chloride and a copolymer containing 50% by weight or more of vinyl chloride, and is one of five general-purpose thermoplastic resins prepared by suspension polymerization or emulsion polymerization. When preparing a polyvinyl chloride resin by suspension polymerization, plasticizers, stabilizers, fillers, pigments, and auxiliary materials with special functions are added. The polyvinyl chloride resin prepared in this way is used in the manufacture of various products such as films, sheets, electric wires, and pipes through various processing methods. However, since chlorine gas and hydrogen chloride gas are generated during combustion of PVC resins, harmful gases are generated in case of fire. In addition, phthalate-based compounds are used as plasticizers to impart flexibility to PVC resins. The phthalate-based compounds are known as environmental hormones that are harmful to the human body.

In addition, a t-PMMA resin is a resin developed to increase the low brittleness of a PMMA resin, and is prepared by compounding a polymer obtained by polymerizing acrylic rubber as a core and methyl methacrylate as a shell and a polymethylmethacrylate resin. The t-PMMA resins have excellent surface hardness and colorability, but the use thereof is limited due to low impact strength at room temperature and low temperature.

To solve these problems, research on materials capable of replacing PVC resins and t-PMMA resins is being actively conducted. Thereamong, acrylonitrile-styrene-acrylate resins (hereinafter referred to as "ASA resins") have excellent weather resistance, light resistance, colorability, chemical resistance, and impact resistance, and thus, are used in various fields such as automobiles, building materials, and miscellaneous goods. In particular, compared to PVC resins, ASA resins have excellent processing stability and do not contain heavy metal components, so ASA resins are in the spotlight as eco-friendly materials.

In addition, as the importance of aesthetics increases in the market, research is being conducted to realize a luxurious appearance and excellent colorability and weather resistance by finishing the surface of a substrate, such as an acrylonitrile-butadiene-styrene resin, a PVC resin, or an iron plate, with an ASA resin. These finishing materials are mainly manufactured in the form of films. Depending on the shape of a substrate, the finishing material is manufactured into a final product through a bending process such as bending or folding. However, due to the characteristics of a thermoplastic ASA resin, when the above-described finishing treatment is applied at room temperature, whitening occurs in folded portions, resulting in loss of original color and deterioration of appearance and aesthetics.

Therefore, there is a need to develop a thermoplastic resin composition that is applicable to various processing such as T-die extrusion processing and calender processing, is eco-friendly, and does not cause whitening after bending processing.

RELATED ART DOCUMENTS

Patent Documents

Japanese Patent No. 1995-033470

DISCLOSURE

Technical Problem

Therefore, the present invention has been made in view of the above problems, and it is one object of the present invention to provide a thermoplastic resin composition that does not contain phthalate-based compounds, which are environmental hormones harmful to the human body; does not emit toxic gases in case of fire; has processability equal or superior to that of a PVC resin during calendering and T-die extrusion; has excellent mechanical properties, such as impact strength, tensile strength, and elongation, surface hardness, and heat resistance; and is capable of preventing occurrence of whitening during bending due to excellent non-whitening properties.

It is another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; 18 to 47% by weight of an aromatic vinyl compound-vinyl cyanide compound copolymer (B) having a weight average molecular weight of 70,000 to 150,000 g/mol; and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1 below:

$$X=\{(G-Y)/Y\}\times 100, \quad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; 18 to 47% by weight of an aromatic vinyl compound-vinyl cyanide compound copolymer (B) having a weight average molecular weight of 70,000 to 150,000 g/mol; and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has a heat deflection temperature of 71° C. or higher as measured under a load of 18.6 kgf according to ASTM D648.

In addition, the present invention may provide a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; 18 to 47% by weight of an aromatic vinyl compound-vinyl cyanide compound copolymer (B) having a weight average molecular weight of 70,000 to 150,000 g/mol; and 3 to 28% by weight of an aromatic vinyl compound-vinyl cyanide compound copolymer (C) having a weight average molecular weight of greater than 150,000 g/mol and less than or equal to 250,000 g/mol, wherein the graft copolymer (A) includes 20 to 60% by weight of an alkyl acrylate and 40 to 80% by weight of an aromatic vinyl compound-vinyl cyanide compound copolymer.

In accordance with another aspect of the present invention, provided is a method of preparing a thermoplastic resin composition, the method including kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm, 18 to 47% by weight of an aromatic vinyl compound-vinyl cyanide compound copolymer (B) having a weight average molecular weight of 70,000 to 150,000 g/mol, and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1 below:

$$X=\{(G-Y)/Y\}\times 100, \quad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a method of preparing a thermoplastic resin composition, the method including kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm, 18 to 47% by weight of an aromatic vinyl compound-vinyl cyanide compound copolymer (B) having a weight average molecular weight of 70,000 to 150,000 g/mol, and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has a heat deflection temperature of 71° C. or higher as measured under a load of 18.6 kgf according to ASTM D648.

In addition, the present invention may provide a method of preparing a thermoplastic resin composition, the method including kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm, 18 to 47% by weight of an aromatic vinyl compound-vinyl cyanide compound copolymer (B) having a weight average molecular weight of 70,000 to 150,000 g/mol, and 3 to 28% by weight of an aromatic vinyl compound-vinyl cyanide compound copolymer (C) having a weight average molecular weight of greater than 150,000 g/mol and less than or equal to 250,000 g/mol, wherein the graft copolymer (A) includes 20 to 60% by weight of an alkyl acrylate and 40 to 80% by weight of an aromatic vinyl compound-vinyl cyanide compound copolymer.

In accordance with yet another aspect of the present invention, provided is a molded article including the thermoplastic resin composition.

Advantageous Effects

According to the present invention, the present invention has an effect of providing a thermoplastic resin composition that does not contain phthalate-based compounds, which are environmental hormones harmful to the human body; does not emit toxic gases in case of fire; has processability equal or superior to that of a PVC resin, which is a material for calendering and T-die extrusion; has excellent mechanical properties, such as impact strength, tensile strength, and elongation, surface hardness, and heat resistance; and is capable of preventing occurrence of whitening during bending due to excellent non-whitening properties, a method of preparing the thermoplastic resin composition, and a molded article including the thermoplastic resin composition.

DESCRIPTION OF DRAWINGS

The FIG. 1 includes images taken after hitting, using a Gardner impact tester, films manufactured in Example 2 (left image) and Comparative Example 1 (right image) to check whether whitening occurs.

BEST MODE

Hereinafter, a thermoplastic resin composition, a method of preparing the same, and a molded article including the same according to the present invention will be described in detail.

The present inventors confirmed that, when an alkyl acrylate-aromatic vinyl compound-vinyl cyanide compound graft copolymer containing rubber having a predetermined average particle diameter and two or more types of aromatic vinyl compound-vinyl cyanide compound copolymers having different weight average molecular weights were mixed in a predetermined composition ratio, and the alkyl acrylate coverage value of a thermoplastic resin composition was adjusted within a predetermined range, the thermoplastic resin composition had processability equal or superior to that of a PVC resin during calendering and T-die extrusion, the mechanical properties, surface hardness, and heat resistance of the thermoplastic resin composition were improved, and the thermoplastic resin composition had excellent non-whitening properties. Based on these results, the present inventors conducted further studies to complete the present invention.

The thermoplastic resin composition of the present invention will be described in detail as follows.

The thermoplastic resin composition of the present invention includes 25 to 75% by weight of an alkyl acrylate-aromatic vinyl compound-vinyl cyanide compound graft copolymer (A) containing alkyl acrylate rubber having an average particle diameter of 50 to 120 nm; 18 to 47% by weight of an aromatic vinyl compound-vinyl cyanide compound copolymer (B) having a weight average molecular weight of 70,000 to 150,000 g/mol; and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1 below. In this case, the thermoplastic resin composition has excellent processability during calendering and T-die extrusion, has excellent mechanical properties, such as impact strength, tensile strength, and elongation, surface hardness, and heat resistance, and has excellent non-whitening properties.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

Hereinafter, each component constituting the thermoplastic resin composition of the present invention will be described in detail.

(A) Alkyl Acrylate-Aromatic Vinyl Compound-Vinyl Cyanide Compound Graft Copolymer For example, the graft copolymer (A) may contain alkyl acrylate rubber having an average particle diameter of 50 to 120 nm, preferably 60 to 120 nm, still more preferably 80 to 110 nm. Within this range, a finally prepared thermoplastic resin composition may have excellent impact strength and gloss.

In this description, the average particle diameter may be measured by dynamic light scattering, and specifically, may be measured as an intensity value using a particle size analyzer (product name: Nicomp 380, manufacturer: PSS) in a Gaussian mode. As a specific measurement example, a sample may be prepared by diluting 0.1 g of latex (total solids content: 35 to 50 wt %) 1,000 to 5,000-fold with distilled water, and average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 psec.

For example, based on a total weight of the components (A), (B), and (C), the graft copolymer (A) may be included in an amount of 25 to 75% by weight, preferably 30 to 70% by weight, more preferably 40 to 60% by weight, still more preferably 45 to 55% by weight. Within this range, excellent processability may be achieved during calendering and T-die extrusion, and mechanical properties, such as impact strength, tensile strength, and elongation, gloss, and surface hardness may be excellent.

For example, the graft copolymer (A) may include 20 to 60% by weight of alkyl acrylate rubber (a-1) and 40 to 80% by weight of an aromatic vinyl compound-vinyl cyanide compound copolymer (a-2), preferably 30 to 50% by weight of alkyl acrylate rubber (a-1) and 50 to 70% by weight of an aromatic vinyl compound-vinyl cyanide compound copolymer (a-2), more preferably 40 to 50% by weight of alkyl acrylate rubber (a-1) and 50 to 60% by weight of an aromatic vinyl compound-vinyl cyanide compound copolymer (a-2). Within this range, mechanical properties, gloss, and surface hardness may be excellent.

In this description, a polymer including a certain compound means a polymer prepared by polymerizing the compound, and a unit in the polymer is derived from the compound.

For example, the alkyl acrylate rubber (a-1) may further include an aromatic vinyl compound. In this case, chemical resistance and impact resistance may be excellent. For example, based on 100% by weight in total of the acrylate rubber, the alkyl acrylate rubber (a-1) may include the aromatic vinyl compound in an amount of 0.1 to 25% by weight, preferably 2 to 23% by weight, more preferably 5 to 20% by weight, still more preferably 10 to 20% by weight. Within this range, mechanical properties, gloss, and surface hardness may be excellent without deterioration of physical properties.

For example, the copolymer (a-2) may further include an alkyl acrylate. In this case, physical property balance between impact resistance, weather resistance, processability, and non-whitening properties may be excellent.

For example, based on 100% by weight in total of the copolymer (a-2), the copolymer (a-2) may include 55 to 85% by weight of an aromatic vinyl compound, 10 to 30% by weight of a vinyl cyanide compound, and 0.1 to 20% by weight of an alkyl acrylate, preferably 60 to 80% by weight of an aromatic vinyl compound, 13 to 26% by weight of a vinyl cyanide compound, and 3 to 20% by weight of an alkyl acrylate, more preferably 65 to 78% by weight of an aromatic vinyl compound, 15 to 22% by weight of a vinyl cyanide compound, and 5 to 17% by weight of an alkyl acrylate. Within this range, impact resistance and weather resistance may be excellent.

For example, the graft copolymer (A) may be prepared by emulsion polymerization. In this case, gloss and surface hardness may be excellent.

For example, the alkyl acrylate may be an alkyl acrylate containing an alkyl group having 1 to 15 carbon atoms, preferably includes one or more selected from the group consisting of methyl acrylate, ethyl acrylate, propyl acrylate, butyl acrylate, 2 ethylbutyl acrylate, octyl acrylate, 2-ethylhexyl acrylate, hexyl acrylate, heptyl acrylate, n-pentyl acrylate, and lauryl acrylate. More preferably, the alkyl acrylate is an alkyl acrylate having 2 to 8 carbon atoms, still more preferably butyl acrylate, ethylhexyl acrylate, or a mixture thereof, still more preferably butyl acrylate.

For example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably one or more selected from the group consisting of styrene and α-methyl styrene, more preferably styrene. In this case, processability may be excellent due to proper fluidity, and mechanical properties such as impact resistance may be excellent.

For example, the vinyl cyanide compound may include one or more selected from the group consisting of acrylonitrile, methacrylonitrile, ethylacrylonitrile, and isopropylacrylonitrile, preferably acrylonitrile.

Emulsion polymerization commonly practiced in the art to which the present invention pertains may be used in the present invention without particular limitation.

For example, the graft copolymer (A) may have a grafting degree of 60% or more, preferably 60 to 150%, more preferably 62 to 140%, still more preferably 65 to 130%, still more preferably 65 to 100%, still more preferably 65 to 80%, as calculated by Equation 3 below. Within this range, impact resistance, processability, and non-whitening properties may be excellent.

$$\text{Grafting degree (\%)} = [\text{Weight (g) of grafted monomers}/\text{Rubber weight (g)}] \times 100 \quad \text{[Equation 3]}$$

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

When the weight of insoluble matter (gel) is measured, 0.5 g of powdered graft copolymer (A) is added to 50 ml of acetone, followed by stirring at room temperature for 12 hours. Then, centrifugation is performed to separate insoluble matter that is not dissolved in acetone, followed by drying for 12 hours. Then, the weight of the insoluble matter (gel) is measured. The rubber weight (g) is the weight (g) of rubber components theoretically added to 0.5 g of the powdered graft copolymer (A).

As a specific measurement example, when measuring the weight (g) of insoluble matter (gel), 0.5 g of a powdered graft copolymer is added to 50 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the weight of the insoluble matter (gel) is measured.

(B) Aromatic Vinyl Compound-Vinyl Cyanide Compound Copolymer Aromatic Vinyl Compound Copolymer Having Weight Average Molecular Weight of 70,000 to 150,000 g/Mol The copolymer (B) preferably has a weight average molecular weight of 80,000 to 130,000 g/mol, more preferably 80,000 to 110,000 g/mol, still more preferably 85,000 to 100,000 g/mol. Within this range, excellent processability may be achieved during calendering and T-die extrusion, and mechanical properties, such as impact strength, tensile strength, and elongation, gloss, and surface hardness may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1× PLgel 10 μm MiniMix-B (250×4.6 mm)+1× PLgel 10 μm MiniMix-B (250×4.6 mm)+1× PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, based on a total weight of the components (A), (B), and (C), the copolymer (B) may be included in an amount of 18 to 47% by weight, preferably 25 to 45% by weight, more preferably 30 to 40% by weight, still more preferably 33 to 37% by weight. Within this range, excellent processability may be achieved during calendering and T-die extrusion, and mechanical properties, such as impact strength, tensile strength, and elongation, gloss, surface hardness, and non-whitening properties may be excellent.

For example, the copolymer (B) may include 55 to 85% by weight of an aromatic vinyl compound and 15 to 45% by weight of a vinyl cyanide compound, preferably 60 to 80% by weight of an aromatic vinyl compound and 20 to 40% by weight of a vinyl cyanide compound, more preferably 65 to 75% by weight of an aromatic vinyl compound and 25 to 35% by weight of a vinyl cyanide compound. Within this range, excellent processability may be achieved during calendering and T-die extrusion, and gloss, surface hardness, and non-whitening properties may be excellent.

For example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

The copolymer (B) is preferably a styrene-acrylonitrile copolymer (SAN resin), an α-methylstyrene-acrylonitrile copolymer (heat-resistant SAN resin), or a mixture thereof, more preferably a styrene-acrylonitrile copolymer (SAN resin). In this case, excellent processability may be achieved during calendering and T-die extrusion, and gloss and surface hardness may be excellent.

For example, the copolymer (B) may be prepared by suspension polymerization, emulsion polymerization, solution polymerization, or bulk polymerization, preferably bulk polymerization. In this case, mechanical properties may be excellent.

Suspension polymerization, emulsion polymerization, solution polymerization, and bulk polymerization commonly practiced in the art to which the present invention pertains may be used in the present invention without particular limitation.

(C) Aromatic Vinyl Compound-Vinyl Cyanide Compound Copolymer Having Weight Average Molecular Weight of Greater than 150,000 g/Mol and Less than or Equal to 250,000 g/Mol The copolymer (C) preferably has a weight average molecular weight of 160,000 to 230,000 g/mol, more preferably 160,000 to 210,000 g/mol, still more preferably 160,000 to 190,000 g/mol. Within this range, excellent processability may be achieved during calendering and T-die extrusion, and gloss, surface hardness, and non-whitening properties may be excellent.

For example, based on a total weight of the components (A), (B), and (C), the copolymer (C) may be included in an amount of 3 to 28% by weight, preferably 5 to 25% by weight, more preferably 10 to 25% by weight, still more preferably 12 to 20% by weight. Within this range, excellent processability may be achieved during calendering and T-die extrusion, and gloss, surface hardness, and non-whitening properties may be excellent.

For example, the copolymer (C) may include 55 to 85% by weight of an aromatic vinyl compound and 15 to 45% by weight of a vinyl cyanide compound, preferably 60 to 80% by weight of an aromatic vinyl compound and 20 to 40% by weight of a vinyl cyanide compound, more preferably 65 to 75% by weight of an aromatic vinyl compound and 25 to 35% by weight of a vinyl cyanide compound. Within this range, excellent processability may be achieved during calendering and T-die extrusion, and gloss, surface hardness, and non-whitening properties may be excellent.

The copolymer (C) is preferably a styrene-acrylonitrile copolymer (SAN resin). In this case, excellent processability may be achieved during calendering and T-die extrusion, and gloss and surface hardness may be excellent.

For example, the copolymer (C) may be prepared by suspension polymerization, emulsion polymerization, solution polymerization, or bulk polymerization, preferably bulk polymerization. In this case, mechanical properties may be excellent.

Suspension polymerization, emulsion polymerization, solution polymerization, and bulk polymerization commonly practiced in the art to which the present invention pertains may be used in the present invention without particular limitation.

For example, the copolymer (C) may be included in a smaller amount than the copolymer (B). Preferably, the weight ratio of the copolymer (B) to the copolymer (C) (B:C) is 1.5:1 to 5.5:1, more preferably 1.7:1 to 5:1, still more preferably 2:1 to 4:1, still more preferably 2:1 to 3:1. Within this range, processability may be excellent during calendering and T-die extrusion, and non-whitening properties may be excellent.

Thermoplastic Resin Composition

The thermoplastic resin composition of the present invention preferably has an alkyl acrylate coverage value (X) of 67% or more, preferably 67 to 150%, more preferably 70 to 140%, still more preferably 75 to 120%, still more preferably 75 to 110% as calculated by Equation 1 below. Within this range, mechanical properties, such as impact strength, tensile strength, and elongation, surface hardness, and heat resistance may be excellent. In particular, due to excellent non-whitening properties, occurrence of whitening during bending may be prevented.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In Equation 1, the content of the alkyl acrylate in the gel of the thermoplastic resin composition is the content of an alkyl acrylate (based on 100% by weight in total of the added thermoplastic resin composition) in insoluble matter obtained in the process of measuring the above-described gel content. Here, the gel content is the content of insoluble matter based on 100% by weight in total of the thermoplastic resin composition.

The content of an alkyl acrylate in the gel may be quantitatively measured by nuclear magnetic resonance (NMR) analysis or Fourier transform infrared spectroscopy (FT-IR) analysis.

In this description, unless otherwise specified, NMR analysis means analysis by $^1$H NMR.

In this description, NMR analysis commonly performed in the art may be used in the present invention, and a specific measurement example is as follows.

Equipment name: Bruker 600 MHz NMR (AVANCE III HD) CPP BB (1H 19F tunable and broadband, with z-gradient) Prodigy Probe Measurement conditions: $^1$H NMR (zg30): ns=32, d1=5 s, TCE-d2, at room temperature When measuring the gel content, 1 g of a thermoplastic resin composition is added to 30 ml of acetone, followed by stirring at room temperature for 12 hours. Then, centrifugation is performed to separate insoluble matter that is not dissolved in acetone, followed by drying for 12 hours. Then, the gel content is measured and calculated by Equation 2 below. As a specific measurement example, when measuring the gel content, 1 g of a thermoplastic resin composition is added to 30 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the gel content is measured.

$$\text{Gel content (wt \%)}=[\text{Weight (g) of insoluble matter (gel)}/\text{Weight (g) of sample}]\times 100 \quad \text{[Equation 2]}$$

In this description, the alkyl acrylate coverage value is a parameter for measuring the degree of dispersion of an aromatic vinyl compound-vinyl cyanide compound polymer grafted onto alkyl acrylate rubber in the thermoplastic resin composition. When the alkyl acrylate coverage value is high, the aromatic vinyl compound-vinyl cyanide compound polymer is evenly grafted onto the alkyl acrylate rubber to cover the alkyl acrylate rubber uniformly, thereby increasing gloss and achieving excellent tensile strength, colorability and non-whitening properties. In addition, as the alkyl acrylate coverage value increases, the distance between rubber particles is decreased, thereby reducing voids due to cracks occurring inside the thermoplastic resin composition and suppressing whitening during bending.

Here, the alkyl acrylate coverage value indicates the degree of dispersion of the aromatic vinyl compound-vinyl cyanide compound polymer grafted onto the alkyl acrylate in the thermoplastic resin composition, and the grafting degree indicates a degree to which the aromatic vinyl compound-vinyl cyanide compound polymer is grafted onto the alkyl acrylate in an alkyl acrylate-aromatic vinyl compound-vinyl cyanide compound graft copolymer.

In addition, the alkyl acrylate coverage value is obtained by quantitatively calculating the content of the alkyl acrylate present in the thermoplastic resin composition through nuclear magnetic resonance (NMR) analysis or Fourier transform infrared spectroscopy (FT-IR) analysis, and the grafting degree is obtained based on the content of rubber components added during polymerization.

For example, the thermoplastic resin composition may have a melt index (220° C., 10 kg) of 1.8 to 21 g/10 min, preferably 2 to 20.5 g/10 min, more preferably 4 to 20.5 g/10 min, still more preferably 9 to 20.5 g/10 min, still more preferably 15 to 20.5 g/10 min as measured according to ASTM D1238. Within this range, excellent processability may be achieved during calendering and T-die extrusion, and non-whitening properties may be excellent.

Since the thermoplastic resin composition of the present invention has physical properties suitable for calendering, the thermoplastic resin composition is preferably a thermoplastic resin composition for calendering.

In addition, since the thermoplastic resin composition of the present invention has physical properties suitable for T-die extrusion processing, the thermoplastic resin composition is preferably a thermoplastic resin composition for T-die extrusion processing.

For example, the thermoplastic resin composition may have an Izod impact strength (specimen thickness: ¼", room temperature) of 3 kgf·cm/cm or more, preferably 3 to 10 kgf·cm/cm as measured according to ASTM D256. Within this range, physical property balance may be excellent, and processability during calendering and T-die extrusion may be excellent.

In this description, the room temperature may be a temperature within 20±5° C.

For example, when a 1 kg weight is vertically dropped onto an extruded film having dimensions of 0.15 mm×10 cm×10 cm in thickness, width, and length from a height of 25 cm using a Gardner impact tester, haze values before and after impact are measured for a portion of the film hit by the weight according to ASTM D1003, and a difference in the haze values is calculated, the thermoplastic resin composition may have a haze difference (Δhaze) of 5.5 or less, preferably 5 or less, more preferably 4.5 or less, still more preferably 4 or less, still more preferably 1 to 4. In this case, since the thermoplastic resin has excellent non-whitening properties with respect to external impact (strike), the thermoplastic resin may have an excellent appearance.

For example, when a sheet having a thickness of 0.15 mm is manufactured using a T-die extruder, the sheet is cut to a length of 100 cm, thickness is measured at 10 or more locations in an area except for an area within 2 to 3 cm from both ends of the sheet, and thickness deviation is calculated based on a difference between the maximum and minimum thicknesses, the thermoplastic resin composition may have a thickness deviation of 0.06 mm or less, preferably 0.05 mm or less, more preferably 0.01 to 0.05 mm. In this case, physical property balance and non-whitening properties may be excellent, and extrusion moldability may be excellent.

In this description, the thickness may be measured using ABSOLUTE ID-C1012BS (Mitutoyo Co.).

As a specific example of performing extrusion using the T-die extruder to obtain a sheet, extrusion may be performed at an extrusion screw speed of 150 to 200 rpm, an extrusion temperature of 200 to 300° C., a 3-axis roll temperature of 80 to 90° C., and a roll rotation speed of 1 to 5 m/min using a T-die extruder (ST32HS (twin screw, 32 T, L/D=44), Hankook E. M Co.) to obtain a sheet having a thickness of 0.15 mm.

For example, when the thermoplastic resin composition is extruded at an extrusion screw speed of 150 to 200 rpm, an extrusion temperature of 200 to 300° C., a 3-axis roll temperature of 80 to 90° C., and a roll rotation speed 2 to 4 m/min using a T-die extruder, a sheet of 80 cm or more may be obtained without tearing of the sheet. In this case, physical property balance and non-whitening properties may be excellent, and excellent extrusion processability may be secured even at high roll rotation speed.

As a specific example, ST32HS (twin screw, 32 T, L/D=44) manufactured by Hankook E.M Company may be used as the T-die extruder.

For example, when a sheet having dimensions of 15 cm×15 cm in length and width is manufactured through calendering using a roll mill machine, thickness is measured at 10 or more locations in an area except for an area within 2 to 3 cm from both ends of the sheet, and thickness deviation is calculated based on a difference between the maximum and minimum thicknesses, the thermoplastic resin composition may have a thickness deviation of 0.09 mm or less, preferably 0.08 mm or less, more preferably 0.07 mm or less, still more preferably 0.01 to 0.07 mm. Within this range, sheet quality and physical property balance may be excellent, and processability during calendering may be excellent.

For example, the calendering may be performed at a temperature of two calendering rolls of 180 to 220° C. and a calendering roll speed of 8 to 12 rpm under the condition of roll-to-roll distance of 0.3 mm using a roll mill machine (MR-LM0820, Mirae RPM Co.).

For example, the thermoplastic resin composition may have a heat resistance of 71° C. or higher, preferably 73° C. or higher, more preferably 75° C. or higher, still more preferably 80° C. or higher, still more preferably 80 to 85° C. as measured under a load of 18.6 kgf according to ASTM D648. In this case, balance of all physical properties may be excellent.

For example, the thermoplastic resin composition may have a gloss of 95 or more, preferably 97 or more, more preferably 97 to 105 as measured at an angle of incidence of 45° according to ASTM D2457. Within this range, physical property balance may be excellent, and processability during calendering and T-die extrusion may be excellent.

For example, the thermoplastic resin composition may have a tensile strength of 300 $kgf/cm^2$ or more, preferably 350 $kgf/cm^2$ or more, more preferably 400 $kgf/cm^2$ or more, still more preferably 500 $kgf/cm^2$ or more, still more preferably 500 to 600 $kgf/cm^2$ as measured at a cross head speed of 50 mm/min using a specimen having a thickness of 3.2 mm according to ASTM D638. Within this range, physical property balance may be excellent, and processability during calendering and T-die extrusion may be excellent.

For example, the thermoplastic resin composition may have an elongation of 40% or more, preferably 45% or more, more preferably 45 to 70% as measured at a cross head speed of 50 mm/min using a specimen having a thickness of 3.2 mm according to ASTM D638. Within this range, excellent processability may be achieved during calendering and T-die extrusion, and physical property balance may be excellent.

For example, the thermoplastic resin composition may have a Rockwell hardness of 70 or more, preferably 80 or more, more preferably 90 or more, still more preferably 95 to 110 as measured in an R-scale according to ASTM D785.

Within this range, physical property balance may be excellent, and occurrence of press marks may be prevented, and thus appearance may be excellent.

When necessary, based on 100 parts by weight in sum of the components (A), (B), and (C), the thermoplastic resin composition may further include 0.01 to 5 parts by weight, preferably 0.05 to 3 parts by weight, more preferably 0.1 to 2 parts by weight, still more preferably 0.5 to 1 part by weight of one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

The heat stabilizer preferably includes a primary heat stabilizer and a secondary heat stabilizer.

For example, the primary heat stabilizer may be a phenolic heat stabilizer, and preferably includes one or more selected from the group consisting of 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,6-hexanediolbis-[3-(3,5-di-t-butyl-4-hydroxyphenyl)propionate], 2,2-thiodiehylenebis-[3-(3,5-di-t-butyl hydroxyphenyl)propionate], 3,5-di-t-butyl hydroxybenzylphosphonatediethyl ester, tris(2,6-dimethyl hydroxy-4-t-butylbenzyl)isocyanurate, tris(3,5-di-t-butyl hydroxybenzyl)isocyanurate, tris[(3,5-di-t-butyl-4-hydroxyphenyl)propionyloxyethyl]isocyanurate, tris(4-t-butyl-2,6-dimethyl-3-hydroxybenzyl)isocyanurate, 2,2'-methylenebis (4-methyl-6-t-butylphenol)terephthalate, 1,3,5-trimethyl-2,4,6-tris(3,5-di-t-butyl-4-hydroxybenzyl)benzene, 3,9-bis[1,1-dimethyl-2-{β-(3-t-butyl-4-hydroxy-5-methyl-phenyl) propionyloxy}ethyl]-2,4,8,10-tetraoxaspiro[5,5]undecane, 2,2-bis[4-(2-3,5-di-t-butyl-4-hydroxyhydrocinnamoyloxy) ethoxyphenyl]propane, and β-(3,5-di-t-butyl-4-hydroxyphenyl)propionic acid stearyl ester, more preferably octadecyl 3-(3,5-ditert-butyl-4-hydroxyphenyl)propanoate (IR1076).

For example, the secondary heat stabilizer may be a phosphorus heat stabilizer, and preferably includes one or more selected from the group consisting of bis(dialkylphenyl)pentaerythritol diphosphite ester, phosphite ester, trioctyl phosphite, trilauryl phosphite, tridecyl phosphite, (octyl) diphenyl phosphite, tris(2,4-di-t-butylphenyl)phosphite, triphenyl phosphite, tris(butoxyethyl)phosphite, tris(nonylphenyl) phosphite, distearylpentaerythritol diphosphite, tetra(tridecyl)-1,1,3-tris(2-methyl-5-t-butyl-4-hydroxy-phenyl)butane diphosphite, tetra(C12-C15 mixed alkyl)-4,4'-isopropylidenediphenyl diphosphite, tetra(tridecyl)-4,4'-butylidenebis(3-methyl-6-t-butylphenol)diphosphite, tris (mono- and di-mixed nonylphenyl)phosphite, hydrogenated 4,4'-isopropylidenediphenol polyphosphate, phenyl(4,4'-isopropylidenediphenol)pentaerythritol diphosphite, distearylpentaerythritol diphosphite, tris[4,4'-isopropylidenebis (2-t-butylphenol)]phosphite, di(isodecyl)phenyl phosphite, 4,4'-isopropylidenebis(2-t-butylphenol)bis(nonylphenyl) phosphite, bis(2,4-di-t-butyl-6-methylphenyl)ethyl phosphite, 2-[{2,4,8,10-tetra-t-butyldibenzo[d,f][1.3.2]-dioxaphosphepin-6-yl}oxy]-N,N-bis[2-[{2,4,8,10-tetra-t-butyldibenz[d,f][1.3.2]-dioxaphosphepin-6-yl}oxy]ethyl]-ethanamine, and 6-[3-(3-t-butyl-4-hydroxy-5-methylphenyl)propoxy]-2,4,8,10-tetra-t-butyldibenzo[d,f] [1.3.2]-dioxaphosphepin, more preferably tris(2,4-di-tert-butylphenyl)phosphite (IF168).

The lubricant preferably includes one or more selected from the group consisting of an aliphatic amide-based lubricant, a fatty acid ester-based lubricant, and olefin-based wax.

The aliphatic amide-based lubricant preferably includes one or more selected from the group consisting of stearamide, oleamide, erucamide, ethylene bis stearamide, and ethylene bis oleamide.

The fatty acid ester-based lubricant preferably includes one or more selected from the group consisting of fatty acid esters of alcohols or polyhydric alcohols, hardened oil, butyl stearate, monoglyceride stearate, pentaerythritol tetrastearate, stearylstearate, ester wax, and alkyl phosphoric acid ester.

The olefin-based wax is preferably polyethylene wax.

For example, the light stabilizer may include one or more selected from the group consisting of a HALS-based UV stabilizer and a benzotriazole-based UV stabilizer, preferably a mixture of a HALS-based UV stabilizer and a benzotriazole-based UV stabilizer.

The HALS-based UV stabilizer preferably includes one or more selected from the group consisting of bis(2,2,6,6-tetramethyl-4-piperidinyl) sebacate (UV 770), bis[N-methyl-2,2,6,6-tetramethyl-4-piperidinyl]sebacate, and succinic acid dimethyl-1-(2-hydroxyethyl)-4-hydroxy-2,2,6,6-tetramethylpiperidine (Tinuvin 622), more preferably bis(2,2,6,6-tetramethyl-4-piperidinyl)sebacate (UV 770).

The benzotriazole-based UV stabilizer preferably includes one or more selected from the group consisting of 2-(2'-hydroxy-5'-t-octylphenyl)-benzotriazole (Cyasorb UV-541), 2-(2'-hydroxy-5'-methylphenyl)benzotriazole (Tinuvin-P), 2-(2'-hydroxy-3'-tert-butyl-5'-methylphenyl)-5-chloro-benzotriazole (Tinuvin-326), 2-(2'-hydroxy-3',5'-ditert-butylphenyl)-5-chloro-benzotriazole (Tinuvin-327), 2-(2'-hydroxy-3,5-ditert-amylphenyl)benzotriazole (Tinuvin-328), 2-(2'-hydroxy-3',5'-di(1,1-dimethylbenzyl)phenyl]-2H-benzotriazole (Tinuvin-234), 2-(2'-hydroxy-3',5'-di-t-butylphenyl)benzotriazole (Tinuvin-320), and 2-(2H-benzotriazole-2-yl)-4-(1,1,3,3-tetramethylbutyl)phenol (UV 329), more preferably 2-(2H-benzotriazole-2-yl)-4-(1,1,3,3-tetramethylbutyl)phenol (UV 329).

Method of Preparing Thermoplastic Resin Composition

A method of preparing the thermoplastic resin composition of the present invention includes a step of kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm, 18 to 47% by weight of an aromatic vinyl compound-vinyl cyanide compound copolymer (B) having a weight average molecular weight of 70,000 to 150,000 g/mol, and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1 below. In this case, processability during calendering and T-die extrusion may be excellent, and mechanical properties, surface hardness, heat resistance, and non-whitening properties may be excellent.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

The method of preparing the thermoplastic resin composition shares all the technical characteristics of the thermoplastic resin composition described above, and thus repeated description thereof will be omitted.

The kneading and extrusion step is preferably performed at 200 to 300° C. in a size of 10 to 199 pi, more preferably at 210 to 260° C. in a size of 20 to 80 pi, still more preferably at 220 to 250° C. in a size of 25 to 75 pi using an extrusion kneader. Within this range, extrusion may be performed stably, and kneading may be performed efficiently. At this time, the temperature is cylinder temperature, and the pi means the outer diameter of a screw (unit: mm).

Extrusion kneaders commonly used in the art to which the present invention pertains may be used without particular limitation, and a twin-screw extrusion kneader is preferably used.

Molded Article

A molded article of the present invention includes the thermoplastic resin composition. In this case, processability during calendering and T-die extrusion may be excellent, and mechanical properties, surface hardness, heat resistance, and non-whitening properties may be excellent. Thus, a molded article having an aesthetically pleasing appearance may be manufactured, and the thermoplastic resin composition may be applied to manufacture of film or sheet products.

The molded article is preferably an injection-molded article, a calendering-molded article, or a T-die extrusion-molded article. In this case, in addition to mechanical properties, such as impact strength, tensile strength, and elongation, gloss, and surface hardness, non-whitening properties may be excellent.

The molded article is preferably a film or a sheet, and as a specific example, may be a decorative sheet used for indoor furniture, indoor decorations, and the like, a finishing material for outdoor construction materials, or a finishing material for roofs.

A method of manufacturing the molded article preferably includes a step of kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm, 18 to 47% by weight of an aromatic vinyl compound-vinyl cyanide compound copolymer (B) having a weight average molecular weight of 70,000 to 150,000 g/mol, and 3 to 28% by weight of an aromatic vinyl compound-vinyl cyanide compound copolymer (C) having a weight average molecular weight of greater than 150,000 g/mol and less than or equal to 250,000 g/mol to obtain an extrudate and a step of performing injection molding, calender molding, or T-die extrusion molding of the extrudate at a molding temperature of 180 to 300° C. to manufacture a molded article. In this case, processability and heat resistance may be excellent, and mechanical properties, such as impact strength, tensile strength, and elongation, gloss, surface hardness, and non-whitening properties may be excellent.

For example, the extrudate may be in the form of pellets or in the form of a plate.

In this description, the plate-like shape is not particularly limited when the plate-like shape is commonly defined as a plate-like shape in the technical field to which the present invention pertains, and may include, for example, a flat shape, a sheet shape, a film shape, and the like.

As a preferred example, the step of manufacturing a molded article may include a step of calender-molding the prepared extrudate at a calender temperature of 140 to 220° C. to obtain a sheet. In this case, processability may be excellent, and a sheet having a uniform surface may be easily manufactured.

In this description, calender molding is a process of rolling an extrudate using calendering equipment including calendering rolls. Without particular limitation, calender molding may be performed according to a method commonly used in the art to which the present invention pertains. Preferably, calender molding may be performed according to a method including a step of mixing thermoplastic resin composition pellets as a sheet raw material at 130 to 220° C. using a mixer, a step of manufacturing a base sheet at 170 to 240° C. using the mixed raw material, and a step of manufacturing a sheet at 140 to 220° C. using the base sheet and calendering rolls. For example, the step of manufacturing a base sheet may be performed using a mixing roll.

As another preferred example, the method of manufacturing a molded article may include a step of injection-molding the prepared extrudate at an injection temperature of 200 to 260° C., an injection pressure of 60 to 100 bar, and a holding pressure of 25 to 55 bar. In this case, an injection-molded article having excellent mechanical properties such as impact strength may be easily manufactured.

The injection temperature is preferably 200 to 250° C., more preferably 210 to 240° C. Within this range, an injection-molded article having excellent mechanical properties such as impact strength may be easily manufactured.

The injection pressure is preferably 70 to 90 bar, more preferably 75 to 85 bar. Within this range, an injection-molded article having excellent mechanical properties such as impact strength may be easily manufactured.

The holding pressure is preferably 30 to 50 bar, more preferably 35 to 50 bar. Within this range, an injection-molded article having excellent mechanical properties such as impact strength may be easily manufactured.

As another preferred example, the step of manufacturing a molded article may include a step of performing T-die extrusion molding of the prepared extrudate at an extrusion temperature of 200 to 300° C., an extrusion screw speed of 50 to 200 rpm, a 3 axis roll temperature of 60 to 100° C., and a roll rotation speed of 1 to 5 m/min. In this case, processability may be excellent, and a sheet having a uniform surface may be easily manufactured.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

Graft copolymer (A-1): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 90 to 110 nm prepared by emulsion polymerization Graft copolymer (A-2): ASA graft copolymer (core: 37% by weight of butyl acrylate and 9% by weight of styrene, shell: 4% by weight of butyl acrylate, 39% by weight of styrene, and 11% by weight of acrylonitrile, grafting degree: 70%) containing alkyl acrylate rubber having an average particle diameter of 90 to 110 nm prepared by emulsion polymerization Graft copolymer (A-3): ASA graft copolymer (core: 38% by weight of butyl acrylate and 2% by weight of styrene, shell: 4% by weight of butyl acrylate, 43% by weight of styrene, and 13% by weight of acrylonitrile, grafting degree: 70%) containing alkyl acrylate rubber having an average particle diameter of 90 to 110 nm prepared by emulsion polymerization Graft copolymer (A-4): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 60%) containing alkyl acrylate rubber having an average particle diameter of 90 to 110 nm prepared by emulsion polymerization Graft copolymer (A-5): ASA graft copolymer (core: 38% by weight of butyl acrylate and 2% by weight of styrene, shell: 8% by weight of butyl acrylate, 41% by weight of styrene, and 11% by weight of acrylonitrile, grafting degree: 70%) containing alkyl acrylate rubber having an average particle diameter of 90 to 110 nm prepared by emulsion polymerization Graft copolymer (A-6): ASA graft copolymer (core: 43% by weight of butyl acrylate and 2% by weight of styrene, shell: 4% by weight of butyl acrylate, 40% by weight of styrene, and 11% by weight of acrylonitrile, grafting degree: 50%) containing alkyl acrylate rubber having an average particle diameter of 90 to 110 nm prepared by emulsion polymerization Graft copolymer (A-7): ASA graft copolymer (core: 43% by weight of butyl acrylate and 17% by weight of styrene, shell: 4% by weight of butyl acrylate, 26% by weight of styrene, and 10% by weight of acrylonitrile, grafting degree: 40%) containing alkyl acrylate rubber having an average particle diameter of 280 to 330 nm prepared by emulsion polymerization Graft copolymer (A-8): ASA graft copolymer (core: 43% by weight of butyl acrylate and 7% by weight of styrene, shell: 4% by weight of butyl acrylate, 35% by weight of styrene, and 11% by weight of acrylonitrile, grafting degree: 80%) containing alkyl acrylate rubber having an average particle diameter of 25 to 35 nm prepared by emulsion polymerization Graft copolymer (A-9): ASA graft copolymer (core: 43% by weight of butyl acrylate and 7% by weight of styrene, shell: 4% by weight of butyl acrylate, 35% by weight of styrene, and 11% by weight of acrylonitrile, grafting degree: 70%) containing alkyl acrylate rubber having an average particle diameter of 180 to 220 nm prepared by emulsion polymerization SAN resin (B) prepared by bulk polymerization: 95RF (weight average molecular weight: 90,000 g/mol, LG Chemical Co.)

SAN resin (C) prepared by bulk polymerization: 97HC (weight average molecular weight: 170,000 g/mol, LG Chemical Co.)

Examples 1 to 7 and Comparative Examples 1 to 8

According to the contents shown in Tables 1 and 2, the components shown in Tables 1 and 2 were fed into a twin-screw extruder. At this time, 0.1 to 2 parts by weight of each of a lubricant (PASFLOW7501, Patech Fine Chemical Co.), a primary heat stabilizer (IR1076), a secondary heat stabilizer (IF168), a HALS-based UV stabilizer (UV 770), and a benzotriazole-based UV stabilizer (UV 329) were fed into the twin-screw extruder. Then, melt-kneading and extrusion were performed at 230° C. and 150 rpm to prepare pellets. The melt index and alkyl acrylate coverage value of the prepared pellets were measured. Then, the pellets were injected at 200 to 240° C. and a screw speed of 100 to 200 rpm using an injection machine (VC 330/80 TECJ PRO, ENGEL Co.) to obtain a specimen for evaluating appearance and physical properties. In addition, a sheet having a thickness of 0.15 mm was prepared at an extrusion screw speed of 150 to 200 rpm, a temperature of 200 to 280° C., a 3-axis roll temperature of 80° C., and a roll rotation speed of 1.5 m/min using the prepared pellets and a T-die extruder (ST32HS (twin screw, 32 T, L/D=44), Hankook E.M Co.). Then, haze difference and whitening occurrence according to ball dropping was measured.

Test Examples

The properties of the pellets or the specimens prepared in Examples 1 to 7 and Comparative Examples 1 to 8 were measured according to the following methods, and the results are shown in Tables 1 and 2 and the FIGURE.

Measurement Methods

Alkyl acrylate coverage value (%): Alkyl acrylate coverage value was calculated by Equation 1 below.

$$X=\{(G-Y)/Y\}\times 100 \quad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

Here, the content of the alkyl acrylate in the gel was quantitatively measured through $^1$H NMR analysis or FT-IR analysis.

$^1$H NMR

Equipment name: Bruker 600 MHz NMR (AVANCE III HD) CPP BB (1H 19F tunable and broadband, with z-gradient) Prodigy Probe Measurement conditions: $^1$H NMR (zg30): ns=32, d1=5 s, TCE-d2, at room temperature

FT-IR

Equipment name: Agilent Cary 660

Measurement conditions: ATR mode

When measuring the gel content, 1 g of pellets obtained by extruding a thermoplastic resin composition was added to 30 ml of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the gel content was measured and calculated by Equation 2 below.

Gel content (wt %)=[Weight (g) of insoluble matter (gel)/Weight (g) of sample]×100 [Equation 2]

Grafting degree (%): 0.5 g of a powdered graft copolymer was added to 50 ml of acetone, stirred at room temperature for 12 hours, and centrifuged to separate insoluble matter that was not dissolved in acetone, followed by drying for 12 hours. The weight of the insoluble matter was measured, and grafting degree was calculated by Equation 3 below.

Grafting degree (%)=[Weight (g) of grafted monomers/Rubber weight (g)]×100 [Equation 3]

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

Specifically, when measuring the weight (g) of insoluble matter (gel), 0.5 g of a powdered graft copolymer was added to 50 ml of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the weight of the insoluble matter (gel) was measured.

Melt index (MI, g/10 min): Melt index was measured at 220° C. under a load of 10 kg for 10 minutes according to ASTM D1238.

Izod impact strength (IMP, kgf-cm/cm): Izod impact strength was measured at 23° C. using an injection specimen (thickness: ¼") according to ASTM D256.

Gloss: Gloss was measured at an angle of incidence of 45° using an injection specimen (thickness: ¼") and a gloss meter according to ASTM D2457.

Tensile strength (kgf/cm$^2$): Tensile strength was measured at a cross head speed of 50 mm/min using an injection specimen (thickness: 3.2 mm) according to ASTM D638.

Elongation (%): Elongation was measured at a cross head speed of 50 mm/min using an injection specimen (thickness: 3.2 mm) according to ASTM D638.

Surface hardness: Rockwell hardness was measured in an R-scale using an injection specimen (thickness: 3.2 mm) according to ASTM D785.

Heat deflection temperature (HDT, ° C.): Heat deflection temperature was measured under a load of 18.6 kgf according to ASTM D648.

Whether whitening occurs after ball dropping: A 1 kg weight was vertically dropped onto a T-die extrusion film having dimensions of 0.15 mm×10 cm×10 cm in thickness, width, and length from a height of 25 cm using a Gardner impact tester. Then, whether whitening occurred in a portion of the film hit by the weight was determined by visual observation, and occurrence of whitening was evaluated according to the following criteria.

X: No whitening occurs (non-whitening) after ball dropping

○: Whitening occurs after ball dropping

* Haze difference (Δhaze) according to ball dropping: A 1 kg weight was vertically dropped onto a T-die extrusion film having dimensions of 0.15 mm×10 cm×10 cm in thickness, width, and length from a height of 25 cm using a Gardner impact tester. Then, haze values before and after impact at a portion of the film hit by the weight were measured according to ASTM D1003, and haze difference was calculated by Equation 4 below.

Haze difference (Δhaze)=Haze value after ball dropping−haze value before ball dropping [Equation 4]

Calendering Processability: Using a roll mill machine (MR-LM0820, Mirae RPM Co.) in which two calendering rolls having a diameter of 30 cm were installed at an interval of 0.3 mm, calendering of a thermoplastic resin composition in pellet form was performed while maintaining the temperature of the calendering rolls at 180 to 210° C. to obtain a sheet having dimensions of 0.3 mm×15 cm×15 cm in thickness, length, and width. Then, compared to PVC resins, the molten state of a resin, the degree of gas generation, and the degree of tearing when the sheet was attached to the calendering rolls were evaluated as follows.

◎: Superior to PVC, ○: Equal to PVC, X: Inferior to PVC

* Thickness deviation (mm) after calendering: Using a roll mill machine (MR-LM0820, Mirae RPM Co.) in which two calendering rolls having a diameter of 30 cm were installed at an interval of 0.3 mm, calendering of an extruded thermoplastic resin composition in pellet form was performed while maintaining the temperature of the rolls at 180 to 210° C. to obtain a sheet having a thickness of 0.3 mm. Then, thickness was measured at 10 or more locations in an area except for an area within 2 to 3 cm from both ends of the obtained sheet having a size of 15 cm (length)×15 cm (width), and thickness deviation was calculated based on a difference between the maximum and minimum thicknesses. At this time, thickness was measured using ABSOLUTE ID-C1012BS (Mitutoyo Co.).

* T-die extrusion processability: Using a T-die extruder (ST32HS (twin screw, 32 T, L/D=44), Hankook E.M Co.), T-die extrusion was performed at a screw speed of 150 to 200 rpm, a temperature of 200 to 280° C., a 3-axis roll temperature of 80° C., and a roll rotation speed of 1.5 m/min to obtain a sheet having a thickness of 0.15 mm. Then, using the obtained sheet, compared to PVC resins, the molten state of a resin, the degree of gas generation, and the degree of tearing when the sheet was attached to rolls were evaluated as follows.

◎: Superior to PVC, ○: Equal to PVC, X: Inferior to PVC

* Thickness deviation (mm) after T-die extrusion: Using a T-die extruder (ST32HS (twin screw, 32 T, L/D=44), Hankook E.M Co.), T-die extrusion was performed at a screw speed of 150 to 200 rpm, a temperature of 200 to 280° C., a 3-axis roll temperature of 80° C., and a roll rotation speed of 1.5 m/min to obtain a sheet having a thickness of 0.15 mm. The sheet was cut to a length of 100 cm, thickness was measured at 10 or more locations in an area except for an area within 2 to 3 cm from both ends of the sheet, and thickness deviation was calculated based on a difference between the maximum and minimum thicknesses. At this time, thickness was measured using ABSOLUTE ID-C1012BS (Mitutoyo Co.).

TABLE 1

| Classification (parts by weight) | Example 1 | Example 2 | Example 3 | Example 4 | Example 5 | Example 6 | Example 7 |
|---|---|---|---|---|---|---|---|
| ASA (A-1) | 30 | 50 | 60 | 70 | | | |
| ASA (A-2) | | | | | 50 | | |
| ASA (A-3) | | | | | | 50 | |
| ASA (A-4) | | | | | | | 50 |
| SAN (B) | 45 | 35 | 25 | 25 | 35 | 35 | 35 |
| SAN (C) | 25 | 15 | 15 | 5 | 15 | 15 | 15 |
| Grafting degree (%) of ASA (A) | 70 | 70 | 70 | 70 | 70 | 70 | 60 |
| Alkyl acrylate coverage value (%) | 90 | 90 | 90 | 90 | 99 | 71 | 80 |
| Physical properties | | | | | | | |
| MI (g/10 min) | 20.2 | 9.5 | 4.7 | 2.1 | 8.1 | 10.8 | 8.7 |
| Impact strength (¼", kgf · cm/cm) | 3.4 | 5.8 | 6.5 | 7.3 | 7.3 | 4.8 | 6.2 |
| Gloss (45°) | 98.2 | 97.6 | 97.1 | 96.8 | 100.2 | 97.1 | 95.4 |
| Tensile strength ($kgf/cm^2$) | 551 | 449 | 377 | 308 | 444 | 452 | 447 |
| Elongation (%) | 45 | 47 | 65 | 66 | 56 | 45 | 51 |
| Hardness | 106.5 | 91.4 | 80.4 | 71.6 | 91.7 | 91 | 91.4 |
| HDT (° C.) | 85.4 | 81.6 | 77.8 | 73.1 | 81.1 | 82.2 | 81.4 |
| Whether whitening occurs after ball dropping | X | X | X | X | X | X | X |
| Haze difference (ΔHaze) | 4.6 | 3.8 | 2.8 | 2.5 | 2.7 | 3.7 | 3.5 |
| Calendering processability | ◎ | ◎ | ◎ | ◎ | ◎ | ◎ | ◎ |
| Thickness deviation (mm) after calendering | 0.07 | 0.05 | 0.06 | 0.08 | 0.08 | 0.07 | 0.05 |
| T-die processability | ◎ | ◎ | ◎ | ◎ | ◎ | ◎ | ◎ |
| Thickness deviation (mm) after T-die processing | 0.05 | 0.04 | 0.05 | 0.05 | 0.05 | 0.05 | 0.05 |

TABLE 2

| Classification (parts by weight) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| ASA (A-1) | 20 | 80 | | 30 | | | | |
| ASA (A-2) | | | | | | | | |
| ASA (A-3) | | | | | | | | |
| ASA (A-4) | | | | | | | | |
| ASA (A-5) | | | 50 | | | | | |
| ASA (A-6) | | | | | 50 | | | |
| ASA (A-7) | | | | | | 50 | | |
| ASA (A-8) | | | | | | | 50 | |
| ASA (A-9) | | | | | | | | 50 |
| SAN (B) | 50 | 10 | 35 | 25 | 35 | 35 | 35 | 35 |
| SAN (C) | 30 | 10 | 15 | 45 | 15 | 15 | 15 | 15 |
| Grafting degree (%) of ASA (A) | 70 | 70 | 70 | 70 | 50 | 40 | 80 | 70 |
| Alkyl acrylate coverage value (%) | 90 | 90 | 63 | 90 | 51 | 85 | 95 | 86 |
| Physical properties | | | | | | | | |
| MI (g/10 min) | 21.4 | 1.5 | 11.1 | 12.2 | 10.7 | 7.2 | 15.2 | 7 |
| IMP (¼", kgf · cm/cm) | 2.5 | 7.8 | 4.5 | 4.2 | 5.1 | 28.8 | 2.1 | 12.9 |
| Gloss (45°) | 98.5 | 96.6 | 97 | 98 | 95.4 | 91.1 | 101.5 | 92.1 |
| Tensile strength ($kgf/cm^2$) | 609 | 256 | 452 | 560 | 450 | 329 | 689 | 402 |
| Elongation (%) | 33 | 70 | 44 | 44 | 46 | 85 | 16 | 58 |
| Hardness | 114.8 | 63.1 | 91.1 | 106.9 | 90.9 | 81.1 | 116.3 | 89.2 |
| HDT (° C.) | 86.8 | 68.1 | 82.3 | 86.4 | 82.1 | 78.1 | 87.1 | 80.1 |
| Whether whitening occurs after ball dropping | ○ | X | ○ | ○ | ○ | ○ | ○ | ○ |
| Haze difference (ΔHaze) | 7.7 | 2.4 | 5.8 | 7.4 | 6.3 | 12.8 | 6.8 | 9.8 |
| Calendering processability | X | X | ○ | ○ | ○ | X | X | X |

TABLE 2-continued

| Classification (parts by weight) | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Thickness deviation (mm) after calendering | 0.12 | 0.13 | 0.08 | 0.07 | 0.1 | 0.12 | 0.12 | 0.07 |
| T-die processability | ○ | X | ○ | ○ | ○ | X | X | X |
| Thickness deviation (mm) after T-die processing | 0.09 | 0.1 | 0.08 | 0.09 | 0.08 | 0.11 | 0.07 | 0.09 |

As shown in Tables 1 and 2, compared to Comparative Examples 1 to 8 outside of the range of the present invention, in the case of Examples 1 to 7 according to the present invention, excellent processability was achieved during calendering and T-die extrusion, and gloss, surface hardness, and heat resistance were excellent. In addition, mechanical properties such as impact strength, tensile strength, and elongation were excellent. In addition, no whitening occurred after ball dropping. In contrast, in the case of Comparative Example 1 including the ASA graft copolymer (A) in an amount less than the range of the present invention, the haze value changed significantly according to impact induced by ball dropping, and calendering processability deteriorated, resulting in occurrence of whitening. In the case of Comparative Example 2 including the ASA graft copolymer (A) in an amount exceeding the range of the present invention, calendering processability and T-die extrusion processability were poor, and physical properties such as tensile strength and surface hardness deteriorated.

In addition, in the case of Comparative Examples 3 and 5 having an alkyl acrylate coverage value of less than 67% whitening occurred, and haze difference was significant. In addition, the thickness deviation was large after calendering and T-die processing.

In addition, in the case of Comparative Example 4 including the SAN resin (C) in an amount exceeding the range of the present invention, whitening occurred after ball dropping, and the haze value was increased according to impact induced by ball dropping.

In addition, in the case of Comparative Examples 6 to 8 including the ASA graft copolymer (A) containing rubber having an average particle diameter outside of the range of the present invention, haze difference was increased according to impact induced by ball dropping, and thus, whitening was more severe. In addition, calendering processability and T-die extrusion processability deteriorated.

As shown in the FIGURE below, compared to Comparative Example 1, in the case of Example 2 according to the present invention, occurrence of whitening after ball dropping was prevented.

The invention claimed is:

1. A thermoplastic resin composition, comprising:

25 to 75% by weight of an alkyl acrylate-aromatic vinyl compound-vinyl cyanide compound graft copolymer (A) containing alkyl acrylate rubber having an average particle diameter of 50 to 120 nm;

18 to 47% by weight of an aromatic vinyl compound-vinyl cyanide compound copolymer (B) having a weight average molecular weight of 70,000 to 150,000 g/mol; and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1 below:

$$X=\{(G-Y)/Y\}\times 100, \quad \text{[Equation 1]}$$

wherein G represents a content (wt %) of a gel based on a total weight of the thermoplastic resin composition, and Y represents a content (wt %) of the alkyl acrylate in the gel based on the total weight of the thermoplastic resin composition.

2. The thermoplastic resin composition according to claim 1, wherein the alkyl acrylate-aromatic vinyl compound-vinyl cyanide compound graft copolymer (A) comprises 20 to 60% by weight of the alkyl acrylate rubber and 40 to 80% by weight of an aromatic vinyl compound-vinyl cyanide compound copolymer (a-2).

3. The thermoplastic resin composition according to claim 1, wherein the alkyl acrylate-aromatic vinyl compound-vinyl cyanide compound graft copolymer (A) has a grafting degree of 60% or more as calculated by Equation 3 below:

Grafting degree (%)=[Weight (g) of grafted monomers/Rubber weight (g)]×100, [Equation 3]

wherein the weight (g) of the grafted monomers is obtained by subtracting the rubber weight (g) from a weight of the gel obtained by dissolving the graft copolymer (A) in acetone and performing centrifugation, and the rubber weight (g) is a weight (g) of rubber components added during polymerization.

4. The thermoplastic resin composition according to claim 1, wherein the aromatic vinyl compound-vinyl cyanide compound copolymer (B) and the aromatic vinyl compound-vinyl cyanide compound copolymer (C) each independently comprises 55 to 85% by weight of an aromatic vinyl compound and 15 to 45% by weight of a vinyl cyanide compound.

5. The thermoplastic resin composition according to claim 1, further comprising one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent.

6. The thermoplastic resin composition according to claim 1, wherein the thermoplastic resin composition has a melt index of 1.8 to 21 g/10 min as measured according to ASTM D1238 at 220° C. under a load of 10 kg.

7. The thermoplastic resin composition according to claim 1, wherein the thermoplastic resin composition has an Izod impact strength of 3 kgf·cm/cm or more as measured using a specimen having a thickness of ¼" according to ASTM D256 at room temperature.

8. The thermoplastic resin composition according to claim 1, wherein the thermoplastic resin composition is in a form of an extruded film having dimensions of 0.15 mm×10 cm×10 cm in thickness, width, and length, and when a 1 kg weight is vertically dropped onto the extruded film from a height of 25 cm using a Gardner impact tester, haze values before and after impact are measured for a portion of the extruded film hit by the weight according to ASTM D1003, a difference in the haze values before and after the impact is calculated, and a haze difference (ΔHaze) is 5.5 or less.

9. The thermoplastic resin composition according to claim 1, wherein the thermoplastic resin composition is in a form of a T-die extruded sheet having a thickness of 0.15 mm and cut to a length of 100 cm, and when thickness is measured at 10 or more locations in an area except for an area within 2 to 3 cm from both ends of the T-die extruded sheet, thickness deviation is calculated based on a difference between maximum and minimum thicknesses, and the thickness deviation is 0.06 mm or less.

10. The thermoplastic resin composition according to claim 1, wherein the thermoplastic resin composition is in a form of a calendered sheet having dimensions of 15 cm×15 cm in length and width, and when thickness is measured at 10 or more locations in an area except for an area within 2 to 3 cm from both ends of the calendered sheet, thickness deviation is calculated based on a difference between maximum and minimum thicknesses, and the thickness deviation is 0.09 mm or less.

11. The thermoplastic resin composition according to claim 1, wherein the thermoplastic resin composition has a heat deflection temperature of 71° C. or higher as measured under a load of 18.6 kgf according to ASTM D648.

12. A method of preparing a thermoplastic resin composition, comprising kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm, 18 to 47% by weight of an aromatic vinyl compound-vinyl cyanide compound copolymer (B) having a weight average molecular weight of 70,000 to 150,000 g/mol, and 3 to 28% by weight of an aromatic vinyl compound-vinyl cyanide compound copolymer (C) having a weight average molecular weight of greater than 150,000 g/mol and less than or equal to 250,000 g/mol, wherein the thermoplastic resin composition has an alkyl acrylate coverage value (X) of 67% or more as calculated by Equation 1 below:

$$X=\{(G-Y)/Y\}\times 100, \quad \text{[Equation 1]}$$

wherein G represents a content (wt %) of a gel based on a total weight of the thermoplastic resin composition, and Y represents a content (wt %) of the alkyl acrylate in the gel based on the total weight of the thermoplastic resin composition.

13. A molded article, comprising the thermoplastic resin composition according to claim 1.

14. The molded article according to claim 13, wherein the molded article is an injection-molded article, a calendering-molded article, or an extrusion-molded article.

* * * * *